Patented Jan. 6, 1953

2,624,755

UNITED STATES PATENT OFFICE 2,624,755

AROMATIC ESTER AMIDES

Earl W. Gluesenkamp, Centerville, Ohio, assignor to Monsanto Chemical Company, St. Louis, Mo., a corporation of Delaware No Drawing. Application February 27, 1948, Serial No. 11,850

1 Claim. (Cl. 260—490)

This invention relates to new ester amides having desirable properties as are hereinafter described. More particularly the invention relates to compositions of matter made by the reaction of carboxylic acids with aromatic amino compounds.

The primary purpose of this invention is to provide new chemical compositions having both ester and amide functions. A further purpose of this invention is to provide useful plasticizers for resinous compositions, for example polyvinylhalides, particularly polyvinyl chloride, and copolymers of more than 70 percent of the vinyl halide and up to 30 percent of other polymerizable monomers, including vinyl esters, such as vinyl acetate, the alkyl fumarates, such as ethyl fumarate, the alkyl maleates, such as ethyl maleate, the alkyl acrylates and methacrylates, such as methyl methacrylate, and vinyl fluoride or halide other than the principal monomer.

It has been found that ethylene oxide may be condensed with aromatic amines to form N-hydroxyethyl derivatives, which compounds are reacted readily with monocarboxylic acids to form a new class of ester amides having particular utility as plasticizers for the vinyl resins. Suitable aromatic amines for the practice of this invention are aniline, the toluidenes, particularly the o-toluidene, p-cyclohexyl aniline, the diphenyl amines, particularly the o-diphenyl amine, and in general amines having the structural formula:

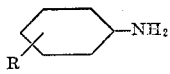

wherein R is an alkyl group having from one to six carbon atoms, a phenyl group or a cyclohexyl group.

The aromatic amines are first condensed with ethylene oxide by contacting the reagents at a temperature of about 75° C. The hydroxyethyl amine so produced is then reacted with monocarboxylic acid by heating the mixture for a sufficient period of time to effect the combination with the hydroxyl group and also with the amino group, thereby producing an ester amide. Suitable carboxylic acids for preparing the new class of plasticizers are those having from 4 to 18 carbon atoms, for example, butyric acid, isovaleric acid, caproic acid, lauroic acid, stearic acid, palmitic acid and homologues thereof. Of particular importance are the ester amides prepared from mixtures of carboxylic acids as prepared by the oxidation of the saponification products of animal and vegetable oils.

The new compositions are preferably prepared by heating the reagents in the presence of inert solvents, such as benzene, toluene, xylene, and petroleum naphtha, and if desired esterification catalysts. The resulting products may be purified by washing and many of the new compositions may be further freed of impurities by distillation at reduced pressures.

Further details of this invention are set forth with respect to the following specific examples.

Example 1

A reaction flask was charged with 374 grams of aniline and a stream of ethylene oxide was bubbled through it at a temperature of 75° C. The reaction was continued until 183.5 grams of ethylene oxide had been absorbed. Upon fractionation of the reaction mixture the following materials were obtained.

| | Grams |
|---|---|
| Aniline, B. P. 75° C. at 13 mm | 95.7 |
| N-2-hydroxyethyl aniline, 160–165° C. at 13 mm | 241.2 |
| Residue | 137 |

Example 2

A 500 ml., 3-necked flask was charged with 72 grams of N-2-hydroxyethyl aniline, 166 grams of 2-ethyl-hexoic acid, and 27 grams of toluene. The flask was provided with a rotary stirring apparatus and a reflux condenser adapted to separate the evaporated water. After refluxing for 18.5 hours the reaction product was washed with sodium bicarbonate, with dilute hydrochloric acid and finally with water. The product which was distilled at 1.5 mm. pressure and a pot temperature of 212° C., was separated and identified as the compound having the structural formula:

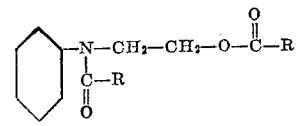

wherein R is the alpha-ethyl-n-pentyl radical. This compound was found to be a valuable plasticizer for vinyl resins, especially where low flex temperatures are desired.

Through the use of procedures analogous to that described in Example 2, other compounds of the following general molecular structure may be formed:

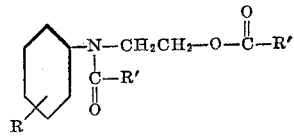

wherein R is a radical of the group consisting of the phenyl, cyclohexyl, and the alkyl radical having from one to six carbon atoms, and R' is an alkyl radical having from 3 to 17 carbon atoms.

The following compounds may thus be prepared:

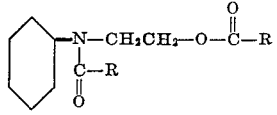

wherein R is the α-ethyl-n-pentyl.

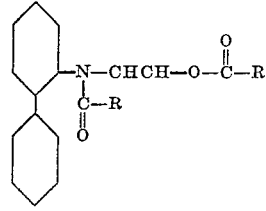

where R is the n-propyl radical.

I claim:

A compound having the structural formula:

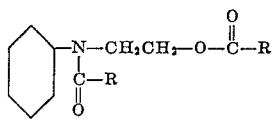

wherein R is the alpha-ethyl-n-pentyl radical.

EARL W. GLUESENKAMP.

REFERENCES CITED

The following references are of record in the file of this patent:

UNITED STATES PATENTS

| Number | Name | Date |
|---|---|---|
| 2,245,593 | Katzman | June 17, 1941 |
| 2,338,380 | Hester | Jan. 4, 1944 |